D. F. CASHMAN & C. A. BROWNFIELD.
ATTACHMENT FOR AEROPLANES.
APPLICATION FILED APR. 14, 1914.
1,190,248.
Patented July 4, 1916.
5 SHEETS—SHEET 1.
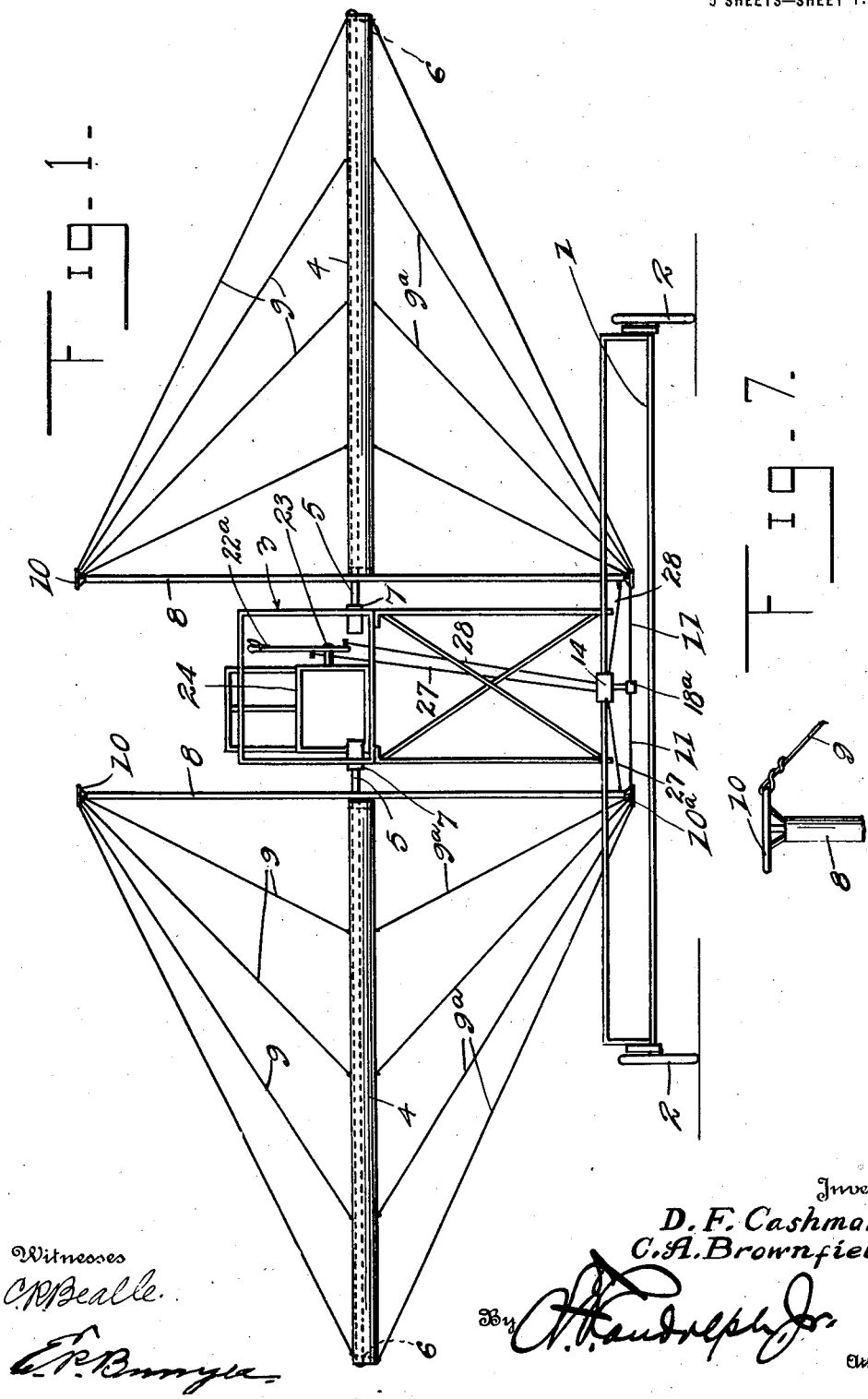
Witnesses
C. P. Bealle
E. R. Bunya
Inventors
D. F. Cashman
C. A. Brownfield
By 
Attorney

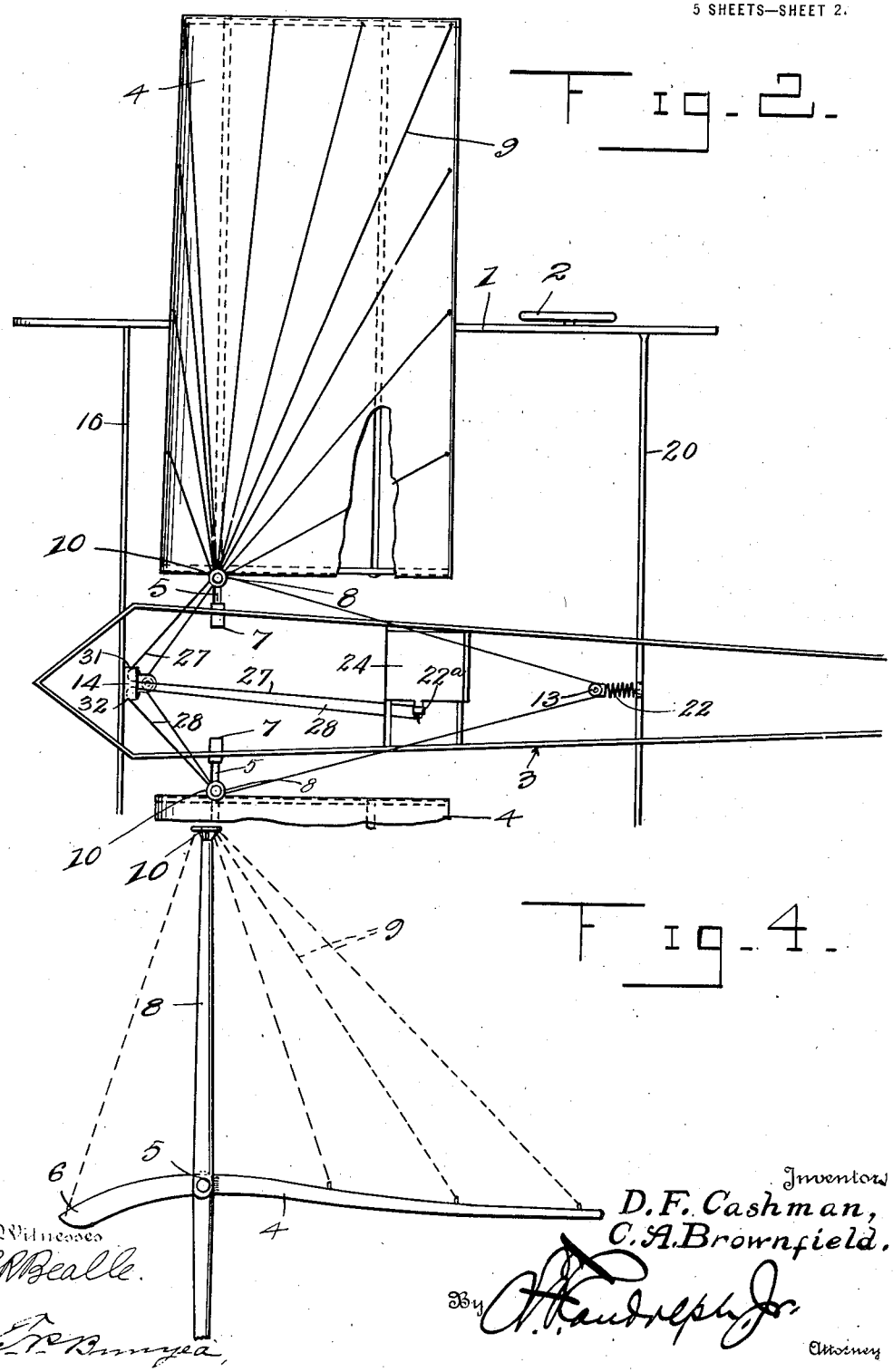

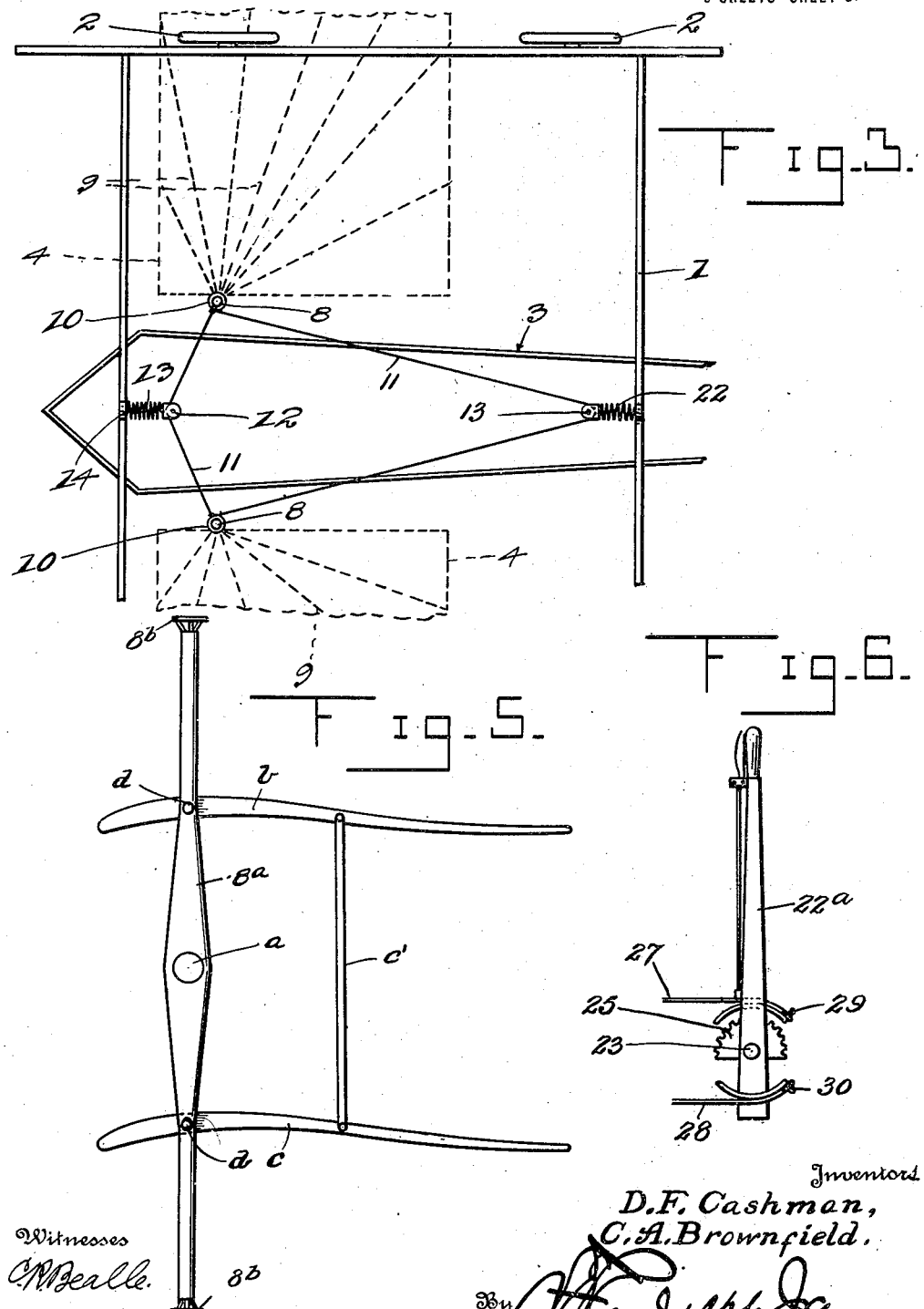

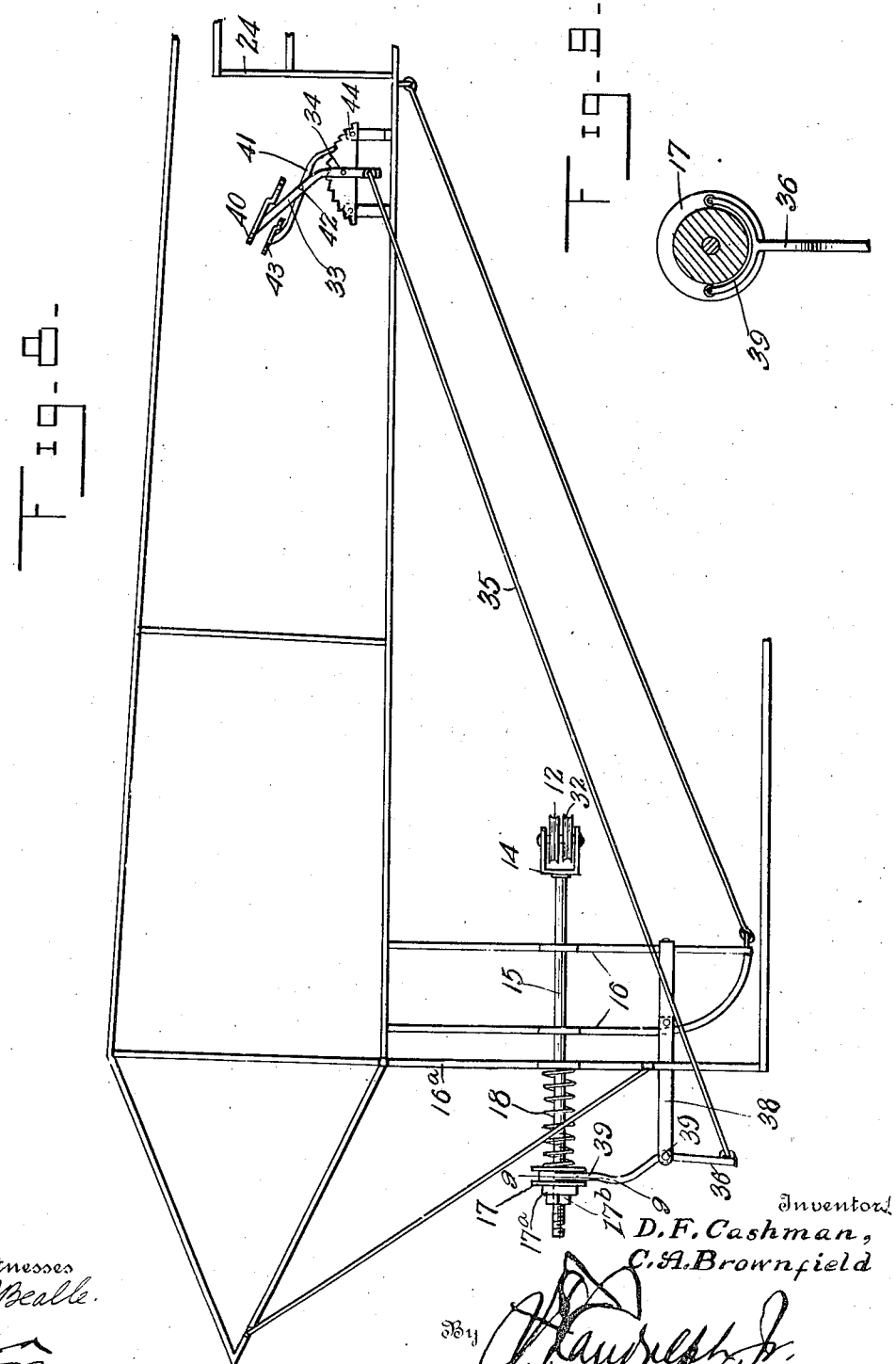

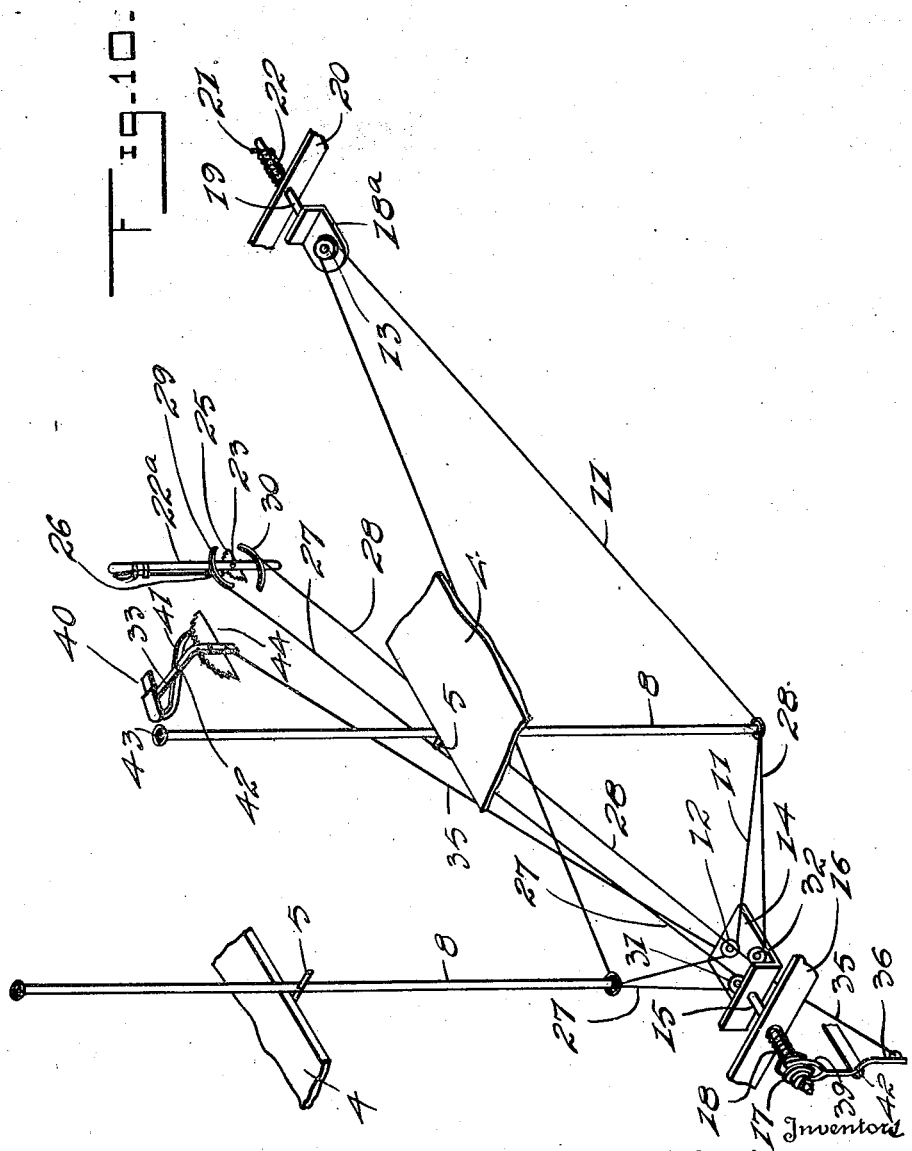

UNITED STATES PATENT OFFICE.

DENIS F. CASHMAN AND CHRIST A. BROWNFIELD, OF ZANESVILLE, OHIO.

ATTACHMENT FOR AEROPLANES.

1,190,248.  Specification of Letters Patent.  Patented July 4, 1916.

Application filed April 14, 1914. Serial No. 831,858.

*To all whom it may concern:*

Be it known that we, DENIS F. CASHMAN, a subject of the King of Great Britain, and CHRIST A. BROWNFIELD, a citizen of the United States, residing at Zanesville, in the county of Muskingum and State of Ohio, have invented certain new and useful Improvements in Attachments for Aeroplanes; and we do hereby declare the following to be a full, clear, and exact description of the invention, such as will enable others skilled in the art to which it appertains to make and use the same.

Our invention relates to improvements in aeroplanes of that type wherein the wings are mounted for independent pivotal movements on horizontal axes extending laterally in the same plane from opposite sides of the fuselage.

One object of the invention is the provision of novel means operable by the wings to automatically and proportionally increase the angle of incidence of one wing as the angle of incidence of the other wing is decreased, whereby to maintain a lateral balance or equilibrium of the aeroplane.

A further object of the invention is the provision of manually operable means by which the angle of incidence of one wing may be increased and the angle of incidence of the other decreased to effect a lateral balance or equilibrium of the aeroplane.

A still further object of the invention is the provision of manually operable means by which the angle of incidence of both wings may be simultaneously increased for starting, alighting, or slow flying, or simultaneously decreased for fast flying.

A still further object of the invention is the provision of reliable and efficient means for bracing the wings of the aeroplane independently, one of the other, without connecting the braces directly to the fuselage or frame of the machine.

With the above and other objects in view, the invention consists in the construction, combination and arrangement of parts hereinafter fully described, claimed, and illustrated in the accompanying drawings, wherein:

Figure 1 is a front elevation of an aeroplane constructed in accordance with our invention, the automatic means and the manually operable means by which a lateral balance or equilibrium of the aeroplane may be maintained being shown diagrammatically, Fig. 2 is a top plan view with one wing broken away, showing diagrammatically the manually operable means by which a lateral balance or equilibrium of the aeroplane may be maintained, Fig. 3 is a top plan view of the aeroplane, showing diagrammatically the automatic means by which a lateral balance or equilibrium of the aeroplane is maintained, Fig. 4 is a detail side elevation of one of the wings, illustrating the manner of bracing the same, Fig. 5 is a side elevation of a modified form of the invention applied to a biplane, Fig. 6 is a detail view in elevation of the manually operable means by which a lateral balance or equilibrium of the aeroplane may be maintained, Fig. 7 is a detail view of the upper end of one of the struts, Fig. 8 is a view in side elevation of the means by which the angle of incidence of both wings may be simultaneously increased or decreased, Fig. 9 is a sectional view taken on the plane indicated by the line 9—9 of Fig. 8, and Fig. 10 is a perspective view illustrating the automatic and the manually operable means for maintaining a lateral balance or equilibrium of the aeroplane, and the means by which the angles of both wings may be simultaneously increased or decreased.

Referring to the drawings by reference numerals, 1 designates the landing frame of an aeroplane constructed in accordance with our invention. The landing frame may be of the usual or any suitable construction. Journaled upon the landing frame 1 are ground wheels 2 and mounted thereon is the fuselage 3. The wings 4 are independently pivoted upon the fuselage 3, each being secured to a shaft or tube 5 of steel. The tubes or shafts 5 extend through the wings 4 near the dips 6 of the front edges of the wings. The tubes or shafts 5 extend inwardly beyond the inner side edges of the wings 4 and the inner ends of the tubes or shafts are journaled in ball bearings 7 carried by the fuselage 3. Struts 8 are secured to the inner ends of the tubes or shafts 5 and extend above and below the wings 4. Braces 9 of steel wire are secured at their lower ends to the upper sides of the wings 4 and at their upper ends to the upper ends of the struts 8. Braces 9ª also of steel wire are secured at their upper ends to the undersides of the wings 4 and at their lower ends to the lower ends of the struts 8. At their upper and lower ends the struts 8 are provided with rings 10 and 10ª, respectively, to which the upper and lower ends of the braces 9 and 9ª are secured, respectively.

The wings 4 and struts 8 are rigidly secured to the shafts 5, and the shafts 5 are adapted to rotate in the bearings 7. It will thus be seen that the wings 4 are mounted for independent pivotal movement on horizontal axes extending laterally in the same plane for opposite sides of the fuselage 3. As shown diagrammatically in Fig. 3 of the drawings, the wings 4 are connected by means which is operable by the wings to automatically and proportionably increase the angle of incidence of one wing as the angle of incidence of the other wing is decreased, whereby to maintain an automatic lateral balance or equilibrium of the aeroplane. This means comprises a wire cable 11 which passes around a pulley 12 at the front of the fuselage 3 and around a pulley 13 at the rear of the fuselage, and which is connected at a point between the pulleys to the lower ends of the struts 8. When the angle of incidence of one of the wings 4 is reduced, the lower end of the strut of that wing is moved rearwardly. Such a movement of the lower end of this strut 8 pulls the cable 11 in a direction to move the lower end of the other strut forwardly, and such a movement of the lower end of the other strut increases the angle of incidence of the wing carried by that strut. It will thus be apparent that if the angle of incidence of one wing is reduced, the angle of incidence of the other wing will be automatically and proportionably increased, and that a lateral balance or equilibrium of the aeroplane will be maintained. By reference to Figs. 8 and 10 of the drawings, it will be seen that the pulley 12 is journaled upon a block 14 which is carried by a rod 15. The rod 15 is slidably mounted at the front of the fuselage 3 in the members 16 and 16ª. A grooved disk 17 is mounted upon the rod 15 in advance of the forward member 16ª, and it is held in place by a nut 17ª and a lock nut 17ᵇ. A spring 18 surrounds the rod 15 and is located between the grooved disk 17 and the forward member 16ª. The pulley 13 is journaled upon a block 18ª which is carried by a rod 19. The rod 19 is slidably mounted upon a rear member 20 of the fuselage 3. Surrounding the rod 19 and located between the member 20 and a pin 21, is a contractile spring 22.

By reference to Figs. 2, 6 and 10 of the drawings, it will be seen that there is provided means by which the angle of incidence of one of the wings may be increased and the angle of incidence of the other decreased manually to effect the lateral balance or equilibrium of the aeroplane. This means comprises a lever 22ª which is fulcrumed at a point intermediate its ends, as at 23, upon the fuselage 3 at a point adjacent the operator's seat 24. A sector rack 25 and a dog 26 are provided to permit the lever 22ª to be secured against accidental movement from its adjusted position. This means also comprises cables 27 and 28. The cable 27 is secured as at 29 to the lever 22ª at a point above its fulcrum 23, and the cable 28 is secured to the lever as at 30 at a point below its fulcrum. The cable 27 passes from the lever 22ª around a pulley 31 journaled upon the block 14 to the lower end of one of the struts 8, and is suitably attached to the strut. The cable 28 extends from the lever 22ª around the pulley 32 to the lower end of the other strut 8. The cable 28 is attached in any suitable manner to this strut, and the pulley 32 is journaled upon the block 14. As the cables 27 and 28 are secured to the lever 22ª at points above and below the fulcrum, respectively, the movement of the lever 22ª in a forward direction will slack the cable 27 and exert a rearward pull upon the cable 28, resulting in an increase in the angle of incidence of the wing 4 to which the cable 27 is attached and a decrease in the angle of incidence of the wing 4 to which the cable 28 is attached. The rearward movement of the lever 22ª will slack the cable 28 and exert a rearward pull upon the cable 27, resulting in an increase in the angle of incidence of the wing 4 to which the cable 28 is attached and a decrease in the angle of incidence of the wing 4 to which the cable 27 is attached.

In Figs. 8 and 10 of the drawings is illustrated the manually operable means by which the angle of incidence of both wings may be simultaneously increased for starting, alighting or slow flying, or simultaneously decreased for fast flying. This means comprises the foot operated lever 33 which is fulcrumed at a point between its ends, as at 34, to the fuselage in advance of the pilot's seat 24. A cable 35 is secured at its rear end to the lower end of the lever 33 and at its front end to the lower end of a lever 36.

The lever 36 is fulcrumed at a point between its ends, as at 37, to the forward end of a bar 38 secured to the front of the fuselage 3. The upper end of the lever 36 is forked as at 39. The forked end of the lever 36 fits in the groove of the disk 17. When a pressure acting in a downward and forward direction is applied to the foot plate 40 of the lever 33, the rod 15 and pulley block 14 are moved forwardly. This movement of the block 14 exerts a forward pull upon the cable 11, moving the lower end of the struts 8 forwardly. This movement of the lower ends of the struts 8 causes the angle of incidence of both wings 4 to be simultaneously increased to a degree suitable for starting, or to a degree suitable for alighting, or to a degree suitable for slow flying. To hold the wings 4 at the angle to which they have been moved, the lever 33 is provided with a dog 41 which is pivoted, at 42, to the lever and which is provided with a foot plate 43. The lower end of the dog is adapted to be moved into and out of engagement with the teeth of a ratchet plate 44. During the adjustment of the wings 4 by the foot pedal 33, the spring 22 and the spring 18 are tensioned, and in view thereof the wings 4 are returned to their original positions as soon as the dog 41 is moved out of engagement with the ratchet 44 by the springs.

It should be apparent from the foregoing description, taken in connection with the accompanying drawings that we provide an aeroplane, the lateral balance or equilibrium of which is maintained automatically. It should also be apparent that the lateral balance or equilibrium of the aeroplane may be maintained manually, and that the angle of incidence of both wings may be simultaneously increased for starting or alighting or slow flying, or simultaneously increased for fast flying, by means of the foot lever 33.

As shown in Fig. 5 the strut 8$^a$ is mounted centrally upon the axle $a$ of a biplane. The upper wing $b$ and the lower wing $b$ and the lower wing $c$ are connected to strut 8$^a$ at $d$ and the vertical brace $c^1$ connects the two wings. The wing braces, not shown, extend from the opposite ends of the strut 8$^a$ to the wings, and said strut is provided with rings 8$^b$ for the connection of the braces similar to those shown in Fig. 7 of the drawings.

Certain modifications and changes may be made in the details of construction without departing from the spirit and scope of the invention as defined in the claims.

Having thus fully described our invention, what we claim and desire to secure by Letters Patent is:

1. An aeroplane including a frame, shafts journaled on the frame, wings carried by the shafts, struts carried by the shafts and extending below the wings, a spring supported pulley located at the front of the frame, a spring supported pulley located at the rear of the frame, and a cable passing about said pulleys, said cable being secured at points intermediate the pulleys to the lower ends of said struts.

2. An aeroplane including a frame, shafts journaled on the frame, wings carried by the shaft, struts carried by the shafts and projecting below the wings, a pulley journaled at the front of the frame, another pulley journaled at the rear of the frame, a cable passing about said pulleys, said cable being secured at points intermediate the pulleys to the lower ends of said struts, other pulleys journaled at the front of the frame, a lever pivoted to the frame at a point in the rear of said front pulleys, other cables secured to the lower ends of said struts and passing about said other front pulleys, one of said other cables being secured to the lever at a point above its pivot and the other to the lever at a point below its pivot.

3. An aeroplane including a frame, shafts journaled on the frame, wings carried by the shafts, struts carried by the shafts and extending below the wings, a spring supported pulley block located at the front of the machine, a spring supported pulley block located at the rear of the frame, a pulley journaled on each of said blocks, a cable passing about the pulleys, said cable being secured at a point intermediate the pulleys to the lower ends of the struts, other pulleys journaled on said front pulley block, other cables secured to the lower ends of said struts and passing around said other pulleys, a lever pivoted to the frame, said other cables having their ends connected to the lever at a point above and below the pivot respectively, and means by which said front pulley block can be manually moved.

4. An aeroplane including a frame, shafts journaled on the frame, wings carried by the shafts, struts carried by the shafts and extending below the wings, a spring supported pulley block located at the front of the frame, a spring supported pulley block located at the rear of the frame, a pulley journaled on each of said blocks, a cable passing about the pulleys, said cable being secured at a point intermediate the pulleys to the lower ends of the struts, other pulleys journaled on said front pulley block, other cables secured to the lower ends of said struts and passing around said other pulleys, a lever pivoted to the frame, said other cables having their ends connected to the lever at a point above and below the pivot respectively, a pivoted lever connected to said front pulley block, a foot operated lever pivoted to the frame, and a cable connected to the front pulley block and the foot pedal.

5. An aeroplane including a frame, shafts journaled on said frame, wings carried by said shafts, struts carried by the shafts and projecting below the wings, means connected to the lower ends of said struts by which the angle of incidence of both wings may be simultaneously increased or decreased, and a second means connecting the lower ends of said struts, said second means being adapted to be operated independently of the first means by wind pressure and on the increase of the angle of incidence of one wing to automatically and proportionally reduce the angle of incidence of the other wing.

6. An aeroplane including a frame, shafts journaled on said frame, wings carried by the shafts, struts carried by the shafts and extending below the wings, means connected to the lower ends of said struts by means of which the angle of incidence of one wing may be increased and the angle of incidence of the other wing decreased manually, and a second means connecting the lower ends of said struts, said second means being adapted to be operated independently of the first means by wind pressure and on the increase of the angle of incidence of one wing to automatically and proportionally reduce the angle of incidence of the other wing.

7. An aeroplane including a frame, shafts journaled on said frame, wings carried by the shafts, struts carried by the shafts and extending below the wings, means connected to the lower ends of the struts so that the angle of incidence of one wing may be increased and the angle of incidence of the other wing decreased manually, a second means by which the angle or angles of incidence of the wings may be increased or decreased manually and simultaneously, and a third means connecting the lower ends of said struts, said third means being adapted to be operated independently of the first and second means by and on the reduction of the angle of incidence of one wing to automatically and proportionally increase the angle of incidence of the other wing.

In testimony whereof we affix our signatures in presence of two witnesses.

DENIS F. CASHMAN.
CHRIST A. BROWNFIELD.

Witnesses:
GEORGE BROWN,
CALDWELL A. BROWN.